(12) United States Patent
Sun et al.

(10) Patent No.: US 11,570,374 B1
(45) Date of Patent: Jan. 31, 2023

(54) SUBJECT-AWARE LOW LIGHT PHOTOGRAPHY

(71) Applicant: Apple Inc., Cupertino, CA (US)

(72) Inventors: Hao Sun, San Jose, CA (US); Farhan A. Baqai, Fremont, CA (US); Giancarlo Todone, Mountain View, CA (US); Gijesh Varghese, Milpitas, CA (US); Morten Poulsen, Palo Alto, CA (US); Richard D. Seely, San Jose, CA (US); Richard J. Shields, Sunnyvale, CA (US); Srivani Pinneli, San Jose, CA (US); Wu Cheng, Millbrae, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 17/357,501

(22) Filed: Jun. 24, 2021

Related U.S. Application Data

(60) Provisional application No. 63/082,217, filed on Sep. 23, 2020.

(51) Int. Cl.
*H04N 5/235* (2006.01)
*H04N 5/232* (2006.01)
*G06T 5/50* (2006.01)
*G06V 40/16* (2022.01)

(52) U.S. Cl.
CPC ............ *H04N 5/2353* (2013.01); *G06T 5/50* (2013.01); *G06V 40/161* (2022.01); *G06V 40/171* (2022.01); *H04N 5/23218* (2018.08); *G06T 2207/20221* (2013.01)

(58) Field of Classification Search
CPC .... H04N 5/2353; H04N 5/23218; G06T 5/50; G06T 2207/20221; G06V 40/161; G06V 40/171
See application file for complete search history.

(56) References Cited

U.S. PATENT DOCUMENTS

| | | | |
|---|---|---|---|
| 2014/0022408 A1* | 1/2014 | Nashizawa .......... | H04N 5/2352 348/222.1 |
| 2015/0350509 A1* | 12/2015 | Tico .................... | H04N 5/2353 348/362 |
| 2020/0175660 A1* | 6/2020 | Iijima .................. | G06T 5/009 |

* cited by examiner

*Primary Examiner* — Gevell V Selby
(74) *Attorney, Agent, or Firm* — Blank Rome LLP

(57) ABSTRACT

Devices, methods, and computer-readable media are disclosed, describing an adaptive, subject-aware approach for image bracket selection and fusion, e.g., to generate high quality images in a wide variety of capturing conditions, including low light conditions. An incoming image stream may be obtained from an image capture device, comprising images captured using differing default exposure values, e.g., according to a predetermined pattern. When a capture request is received, it may be detected whether one or more human or animal subjects are present in the incoming image stream. If a subject is detected, an exposure time of one or more images selected from the incoming image stream may be reduced relative to its default exposure time. Prior to the fusion operation, one of the selected images may be designated a reference image for the fusion operation based, at least in part, on a sharpness score and/or a blink score of the image.

20 Claims, 6 Drawing Sheets

SUBJECT-AWARE LOW LIGHT PHOTOGRAPHY

TECHNICAL FIELD

This disclosure relates generally to the field of digital image processing. More particularly, but not by way of limitation, it relates to techniques for adaptive, subject-aware, approaches to image bracket selection and fusion, e.g., in order to generate low noise and high-quality images in a wide variety of capturing conditions, including image capture in low light conditions and/or with long exposure times.

BACKGROUND

Fusing multiple images of the same captured scene is an effective way of increasing signal-to-noise ratio (SNR) in the resulting fused image. This is particularly important for small and/or thin form factor devices—such as mobile phones, tablets, laptops, wearables, etc.—for which the pixel size of the device's image sensor(s) is often quite small. The smaller pixel size means that there is comparatively less light captured per pixel (i.e., as compared to a full-sized, standalone camera having larger pixel sizes), resulting in more visible noise in captured images—especially in low-light situations.

In image fusion, one of the images to be fused may be designated as the "reference image." The other images that are to be part of the fusion operation may be designated as "candidate images," and the candidate images are registered to the reference image before the fusion operation. The decision of which image in a set of captured images should serve as the reference image may be based on, e.g., an image quality measure (such as sharpness, face quality, noise level, etc.), a capture timing measure (such as the image captured closest in time to a received capture request, e.g., if images are being captured in a streaming fashion), a device condition measurement (such as an image captured with the least amount of device rotation), or any other image condition or set of conditions desired by a given implementation.

Often, when image capture devices are operated in long exposure image capture modes (which may be triggered manually or be triggered automatically, e.g., due to low light conditions in the scene being captured), the relatively large amount of time that passes while an image (or a series of images) of the scene are being captured by the image capture device can result in region(s) of the resultant long exposure image having content that changes dramatically over the time interval during which the image (or series of images) of the scene were captured. This change in content may, e.g., be caused by the motion of objects within the scene during the capture time interval, which may create "motion blurring" or other types of artifacts in the resultant long exposure image.

In such long exposure image capture modes, wherein multiple images of the scene are captured and then fused together to produce a resultant long exposure image, due to the significant capture time differences between the images that are to be fused, the image registration process may not be able to account for local motion within the images, camera shake, and/or rotation between captured images, etc. In these situations, the differences between corresponding pixels in the reference and candidate images may not just be noise—they may instead be differences caused by a failure of the image registration algorithm. For example, a region(s) of the reference image that changes over time across the captured images, e.g., due to object motion or registration errors, may create "ghosting artifacts" in the final fused image. For example, a section of the image that has a certain color in the reference image, but has different colors in the other candidate images will, when combined with the candidate images, result in a blurred or faded look (or a false color region) that is potentially noticeable by a viewer of the final fused image. The overall quality of the final fused image may also be dependent, in some part, on which image is selected for use as the reference image in the fusion operation. Thus, in some embodiments, avoiding ghosting artifacts (and other types of artifacts) may be desirable when fusing multiple image frames for the purpose of noise reduction, especially in low light conditions.

Despite these potential difficulties, in general, by fusing multiple images together, a better quality resultant image may be achieved than may be obtained from a single image capture. The multiple image captures used in a given fusion operation may comprise, e.g.: multiple images captured with the same exposure (e.g., for the purposes of freezing motion), which will be referred to herein as Still Image Stabilization (SIS); multiple images captured with different exposures (e.g., for the purposes of capturing images in low light conditions and/or for highlight recovery, as in the case of High Dynamic Range (HDR) imaging); or a combination of multiple images captured with shorter and longer exposures, as may be captured when an image capture device's Optical Image Stabilization (OIS) system is engaged, e.g., for the purposes of estimating the moving pixels from the shorter exposures and estimating the static pixels from the long exposure(s). Moreover, the captured images to be fused can come from, e.g., the same camera, multiple cameras with different image sensor characteristics, or different processing workflows (such as video capture and still image capture).

Thus, what is needed is an approach to adaptively fuse images (and select reference images) from bracketed captures of arbitrary exposures in a subject-aware fashion, such that the fused result is of a high quality level, even in sub-optimal capturing conditions, such as low light conditions.

SUMMARY

Devices, methods, and computer-readable media are disclosed herein, describing an adaptive, subject-aware approach for image bracket selection and fusion, e.g., to generate high quality images in a wide variety of capturing conditions, including low light conditions. An incoming image stream may be obtained from an image capture device, comprising images captured using differing default exposure values, e.g., according to a predetermined pattern. When a capture request is received, it may be detected whether one or more human or animal subjects are present in the incoming image stream. If a subject is detected, an exposure time of one or more images selected from the incoming image stream may be reduced relative to its default exposure time. Prior to the fusion operation, one of the selected images may be designated a reference image for the fusion operation based, at least in part, on a sharpness score and/or a blink score of the image.

According to some embodiments, a set of rules and/or a decision table may be used to evaluate one or more capture conditions under which the images were captured and determine which two or more images from the incoming image stream should be selected for the fusion operation (and, optionally, what their exposure values should be set or adjusted to). For example, according to some embodiments, a default set of selected images may comprise: two or more EV0 images, one or more EV− image, and one long exposure image. Based on the evaluated capture conditions, the default set of selected images may be modified, e.g., in terms of the number of images selected, sequence of images selected, exposure value of one or more images, the types of images selected, and/or which type of image (or particular image) from the incoming image stream is selected as the reference image for the purpose of the fusion operation. According to some embodiments, an exposure time of at least one selected image may be reduced relative to its default exposure value, based on whether or not one or more human or animal subjects (and/or faces thereof) are detected in the incoming image stream. In still other embodiments, the selection of reference image from among the two or more images from the incoming image stream may be based, at least in part, on a sharpness score (e.g., a face sharpness score) and/or a blink score for the selected reference image.

In some embodiments, the selected images may comprise at least one image from the incoming image stream captured before the receiving of the capture request. In other embodiments, the selected images may further comprise at least one image from the incoming image stream captured after the receiving of the capture request. In some instances, a noise reduction process may also be performed, e.g., on one or more of the selected images prior to the fusion operation, or on the resultant fused image.

Adaptive, subject-aware approaches to image fusion, such as those described herein, may thus combine insights from other fusion schemes used with SIS, OIS, and HDR image capture modes into a single, "unified" bracketing scheme, such that the advantages of highlight recovery, motion freezing, and low noise are at least partially maintained throughout a wide variety of capturing conditions, including low light conditions and/or long exposure times. The captured images to be used as candidate images in a given image fusion operation could consist of a combination of different types of images and/or images with different exposure times, e.g.: EV−, EV0, EV+, and/or long exposure images (which image types will be explained in further detail below). Combining these multiple fusion schemes into one unified scheme may yield quality benefits in output images, as well as a reduction in the tuning and validation efforts required to perform image fusion across a wide variety of capturing conditions.

As mentioned above, various non-transitory program storage device embodiments are disclosed herein. Such program storage devices are readable by one or more processors. Instructions may be stored on the program storage devices for causing the one or more processors to: obtain one or more capture conditions associated with an incoming image stream; receive a capture request (e.g., via a user interface); determine a default long exposure image exposure time based, at least in part, on the capture conditions when the capture request was received; detect one or more human or animal subjects in the incoming image stream; determine, in response to detecting one or more human or animal subjects in the incoming image stream, a reduced long exposure image exposure time, wherein the reduced long exposure image exposure time is shorter than the default long exposure image exposure time; select, in response to the capture request, two or more images from the incoming image stream based, at least in part, on the one or more capture conditions, wherein at least one of the selected images from the incoming image stream comprises an image captured with the reduced long exposure image exposure time; reg-ister the selected two or more images; fuse the registered two or more images to form a fused image; and store the fused image in the memory.

Various methods of taking an adaptive, subject-aware approach to image bracket selection and fusion are also disclosed herein, in accordance with the program storage device embodiments enumerated above. Various programmable electronic devices are also disclosed herein, in accordance with the program storage device embodiments enumerated above. Such electronic devices may include one or more image capture devices, such as optical image sensors/camera units; a display; a user interface; a programmable control device; and a memory coupled to the programmable control device. Instructions may be stored in the memory, the instructions causing the programmable control device to execute instructions in accordance with the various program storage device embodiments enumerated above.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1A:
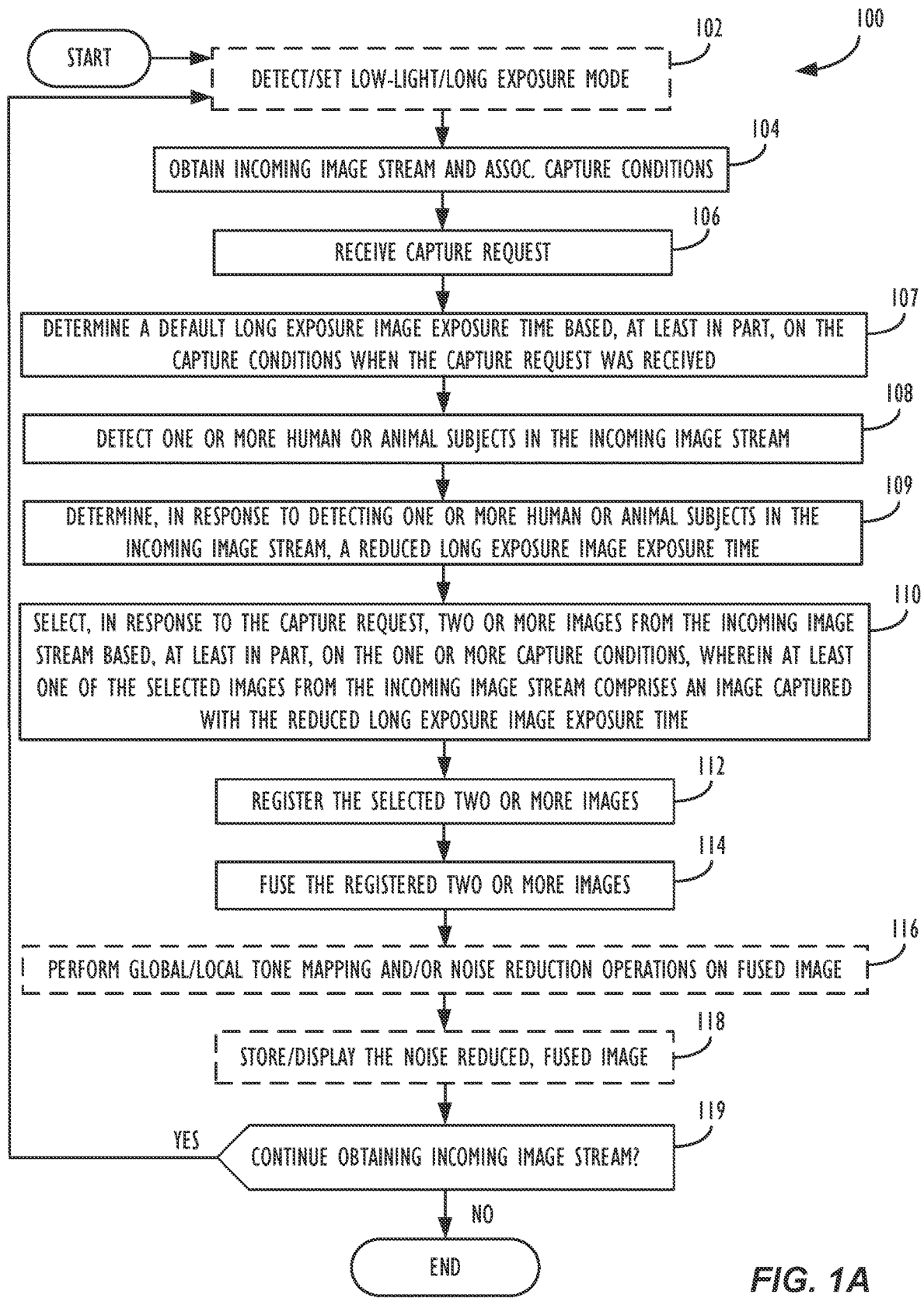
FIG. 1A is a flow chart illustrating a method of adaptive, subject-aware image bracket selection and fusion, according to one or more embodiments.

Referring now to FIG. 1A, a flow chart 100 illustrating a method of adaptive image bracket selection and fusion is shown, according to one or more embodiments. First, in some implementations, the process 100 may detect or set an image capture device into a particular image capture mode, such as low light and/or long exposure image capture mode (Step 102), wherein certain subject-aware image fusion techniques described herein may be applied to improve image quality. In other cases, the subject-aware image fusion techniques described herein may be applied to fusion operations, regardless of whether there is an affirmative or explicit detection or setting of the image capture device into a particular image capture mode that may particularly benefit from subject-aware image bracket selection and fusion. In other words, such techniques may be applied in any instance when an image capture device determines they would be beneficial to image quality. Next, the process 100 may proceed by obtaining an incoming image stream (Step 104), e.g., comprising images captured by one or more cameras or other image capture devices, as well as the associated capture conditions for the images from the incoming image stream. As will be explained in further detail below, the incoming image stream may comprise two or more differently-exposed images.

Discussion will now turn to the nomenclature that will be used herein to refer to the various differently-exposed images from the incoming image stream. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV−" image refers to an underexposed image that is captured at a lower stop (e.g., 0.5, 1, 2, or 3 stops) than would be used to capture an EV0 image. For example, an "EV−1" image refers to an underexposed image that is captured at one stop below the exposure of the EV0 image, and "EV−2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, the incoming image stream may comprise a combination of: EV−, EV0, EV+, and/or long exposure images. It is further noted that the image stream may also comprise a combination of arbitrary exposures, as desired by a given implementation or operating condition, e.g., EV+2, EV+4, EV−3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated and/or modified from default values on-the-fly at capture time (e.g., within a predetermine range) based on ambient lighting, scene content, or other factors, as will be described below. A long exposure image may come from a single image captured from a single camera, or, in other instances, a long exposure image may be "synthesized" from multiple captured images that are fused together (which will be referred to herein as a "synthetic long exposure image"). In instances where the image capture device is capable of performing OIS, the OIS may be actively stabilizing the camera and/or image sensor during capture of the long exposure image and/or one or more of the other captured images. (In other embodiments, there may be no OIS stabilization employed during the capture of the other, i.e., non-long exposure images, or a different stabilization control technique may be employed for such non-long exposure images). In some instances, an image capture device may only use one type of long exposure image. In other instances, the image capture device may capture different types or lengths of long exposure images, e.g., depending on capture conditions and/or scene content. For example, in some embodiments, a synthetic long exposure image may be created when the image capture device does not or cannot perform OIS, while a single long exposure image may be captured when an OIS system is available and engaged at the image capture device.

In some embodiments, long exposure images may comprise images captured with greater than a minimum threshold exposure time, e.g., 50 milliseconds (ms) and less than a maximum threshold exposure time, e.g., 250 ms. In other embodiments, long exposure images may comprise images captured with a comparatively longer exposure time than a corresponding normal or "short" exposure image for the image capture device, e.g., an exposure time that is 4 to 30 times longer than a short image's exposure time. In still other embodiments, the particular exposure time (and/or system gain) of a long exposure image may be further based, at least in part, on ambient light levels around the image capture device(s), with brighter ambient conditions allowing for comparatively shorter long exposure image exposure times, and with darker ambient conditions allowing the use of comparatively longer long exposure image exposure times. In still other embodiments, the particular exposure time (and/or system gain) of a long exposure image may be further based, at least in part, on whether a human and/or pet subject (and/or faces thereof) are detected in the captured scene, and to what extent the faces of such subjects have an influence the overall scene content.

It is to be noted that the noise level in a given image may be estimated based, at least in part, on the system's gain level (with larger gains leading to larger noise levels).

Therefore, in order to have low noise, an image capture system may desire to use small gains. However, the brightness of an image may be determined by the product of exposure time and gain. So, in order to maintain the image brightness, low gains are often compensated for with large exposure times. However, longer exposure times may result in motion blur, e.g., if the camera doesn't have an OIS system and/or if there is significant camera shake during the long exposure image capture. Thus, for cameras that have an OIS system, exposure times could range up to the maximum threshold exposure time in low light conditions, which would allow for the use of a small gain—and hence less noise. However, for cameras that do not have an OIS systems, the use of very long exposure times will likely result in motion blurred images, which is often undesirable. Thus, as may now be understood, the long exposure image's exposure time may not always be the maximum threshold exposure time allowed by the image capture device, and it may instead be reduced by some amount relative to a default long exposure image exposure time.

According to some embodiments, the incoming image stream may comprise a particular sequence and/or particular pattern of exposures. For example, according to some embodiments, the sequence of incoming images may comprise: EV0, EV−, EV0, EV−, and so forth. In other embodiments, the sequence of incoming images may comprise only EV0 images. In response to a received capture request, according to some embodiments, the image capture device may take one (or more) long exposure images. After the long exposure capture, the image capture device may return to a particular sequence of incoming image exposures, e.g., the aforementioned: EV0, EV−, EV0, EV− sequence. The sequence of exposures may, e.g., continue in this fashion until a subsequent capture request is received, the camera(s) stop capturing images (e.g., when the user powers down the device or disables a camera application), and/or one when or more operating conditions may change.

In still other embodiments, the image capture device may capture one or more additional EV0 images (or long exposure images with reduced exposure times) in response to the received capture request and then fuse the additional EV0 or reduced exposure time long exposure images (along with, optionally, one or more additional EV0 and/or EV− images captured prior to or after the received capture request, if so desired) into a "synthetic" long exposure image, which synthetic long image may then be treated as a single image for the purposes of the image fusion selection processes described herein. According to some embodiments, the images in the incoming image stream may be captured as part of a preview operation of a device, or otherwise be captured while the device's camera(s) are active, so that the camera may more quickly react to a user's capture request. Returning to the sequence of incoming images may ensure that the device's camera(s) are ready for the next capture request.

Returning to process 100, upon receipt of a capture request (Step 106), e.g., in the form of a user selection of a physical shutter capture button or other user interface element indicating the user's desire to capture a still image, the process may determine a default long exposure image exposure time based, at least in part, on the capture conditions when the capture request was received (Step 107). For example, scenes with less dynamism or overall scene motion may allow for longer default long exposure image exposure times, while scenes with a large amount of scene motion may lead to a determination of relatively shorter default long exposure image exposure times, and so forth. Next, the process 100 may detect one or more human or animal subjects in the incoming image stream (Step 108). For example, in some implementations, the process may detect the faces and/or bodies of subjects in the incoming image stream. In some embodiments, the detection at Step 108 may be based on identifying faces and/or bodies of human or animal subjects in one or more images captured prior (e.g., immediately prior) to receiving the capture request.

Next, the process 100 may determine, in response to detecting one or more human or animal subjects in the incoming image stream, a reduced long exposure image exposure time, wherein the reduced long exposure image exposure time is shorter than the default long exposure image exposure time (Step 109). In some cases, the reduced long exposure image exposure time may be determined as a percentage of the default long exposure image exposure time—or some other exposure time that is less than the default long exposure image exposure time, e.g., by a predetermined amount or an amount that is determined based on capture conditions. Next, the process 100 may select, in response to the capture request, two or more images from the incoming image stream for fusion, including which image should serve as the reference image for the fusion operation (Step 110). The selection of which images from the incoming image stream to include in the image fusion operation may be based on one or more capture conditions associated with the respective images from the incoming image stream and the detection of one or more human or animal subjects in the incoming image stream made at Step 108. In the event that one or more human or animal subjects are detected in the incoming image stream, at least one of the selected images from the incoming image stream may comprise an image captured with the reduced long exposure image exposure time, e.g., as determined at Step 107.

As will be explained in further detail below, each incoming image may be tagged with various metadata, such as: an indication of whether the image was captured in an HDR mode, an indication of whether the image was captured with OIS engaged, an indication of the movement of the device during the image's capture (e.g., translation, rotation, acceleration, velocity, orientation, etc.), an indication of the EV setting of the captured image, an indication of flicker in the captured image, an indication of ambient light conditions during the capture of the image (e.g., in terms of a signal-to-noise (SNR) ratio, a dynamic range (DR), and AE estimate, etc.), an indication of the nature of the content of the captured image (e.g., brightness, sharpness, tonality, scene classification, person detection, animal detection, face/blink/smile detection), etc. According to some embodiments, a set of rules and/or a decision table may be used to evaluate the one or more capture conditions and determine which two or more images from the incoming image stream are selected for the fusion operation and/or whether certain characteristics of image from the incoming image stream (e.g., default exposure times) should be modified (e.g., reduced) before the image is captured and selected from the incoming image stream for inclusion in the fusion operation.

Next, at Step 112, the selected two or more images may be registered using any desired image registration method, e.g., global registration, local registration, dense optical flow, etc. As mentioned above, one of the selected images may be chosen to serve as the reference image of the registration process, and the other selected images may serve as the candidate images that are to be registered with the reference image. In some embodiments, the reference image may be chosen based on an exposure characteristic (e.g., using an EV− image as the reference image versus using an EV0 image as the reference image) and/or content, as will be explained in greater detail below with reference to FIG. 3 (e.g., biasing selection of a reference image away from images wherein one or more prominent faces in the image are exhibiting blinking, biasing selection of a reference image towards images wherein one or more prominent faces in the image are exhibiting smiles, etc.).

In other embodiments, the reference image may simply be selected as the image captured closest in time to the capture request received from the user. In still other cases, if the image captured closest in time to the capture request is not of a high enough quality (e.g., in terms of sharpness, noise, brightness, face confidence, face quality, blinking, etc.), then a second closest in time image may be selected as the reference image. In other embodiments, the sharpest image may serve as the reference image. In some such embodiments, the sharpest image may be determined by calculating a sharpness score for each image (or each face in each image) that is to be considered for the fusion operation. In some cases, the sharpness score may be based on information in the respective image's metadata, e.g., the image's auto-focus score, the device's positional data during the capture of the respective image, OIS system data, etc. In other cases, the sharpness score for a given image may be based on a subset of image information corresponding to the faces of one or more subjects in the image, also referred to herein as a "face sharpness score," more specifically. In some embodiments, images with below a threshold sharpness score (or face sharpness score) may simply be excluded from fusion operations. If no image has greater than the threshold sharpness score, the device may determine that it is not possible to perform fusion operations for the given capture request. In other embodiments, the threshold sharpness score may be defined as a score that is more than a maximum sharpness threshold below the sharpness score of the selected reference image.

Once the selected two or more images have been registered, they may be fused using any desired image fusion method (Step 114). According to some embodiments, one or more tone mapping operations, e.g., global and/or local tone mapping operations, as well as any desired noise reduction, may be performed on the image subsequently to the fusion operation (Step 116). (It is to be understood that, in some embodiments, the tone mapping and/or noise reduction steps may be optional.)

Finally, at Step 118, the resultant fused image may optionally be stored in a memory and/or display on a display device. So long as the image capture device continues to obtain the incoming image stream (i.e., "YES" at Step 119), the process may return to Step 102 and continue operation. Once the image capture device has ceased to obtain the incoming image stream (i.e., "NO" at Step 119), e.g., in response to the user turning off the image capture device or closing the camera application, the process 100 may end. In some embodiments, the same registration/fusion and/or noise reduction techniques may be applied, regardless of which set of two or more images are selected from the incoming image stream. It is to be understood that certain steps illustrated in FIG. 1A may be performed in a different sequence than is illustrated. For example, in some embodiments, the noise reduction Step 116 could be performed on each individual selected image before the registration and/or fusion steps 112 and 114, respectively.

Figure 1B:
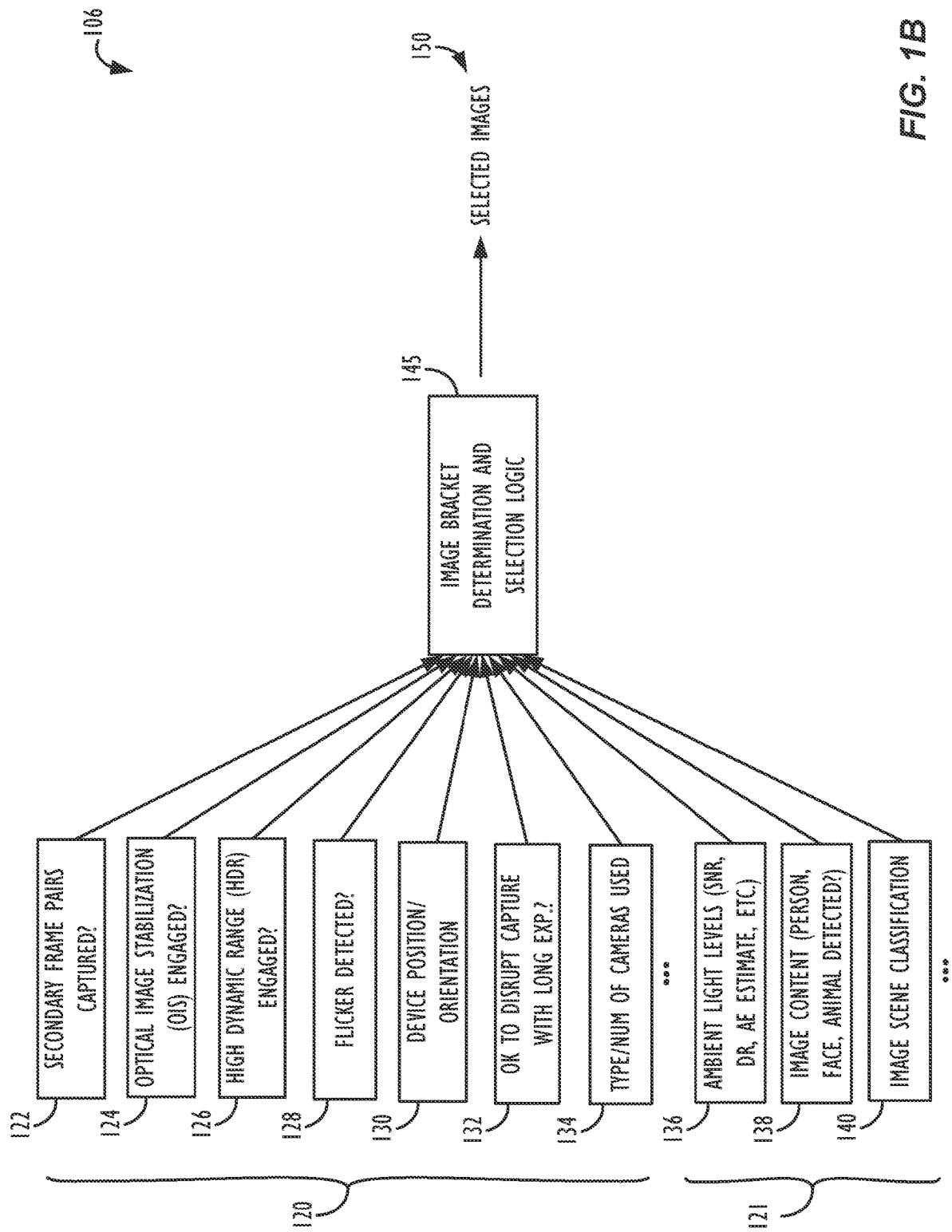
FIG. 1B illustrates various capture conditions that may be considered in an adaptive, subject-aware image bracket selection and fusion method, according to one or more embodiments.

Referring now to FIG. 1B, various capture conditions 122-140 that may be considered in an adaptive, subject-aware image bracket selection and fusion method are shown, according to one or more embodiments. For reference, the various blocks shown in FIG. 1B may be performed as part of Step 110 of FIG. 1A, described above. In particular, the various capture conditions 122-140 may be divided into at least two different categories: device capture conditions 120 and image capture conditions 121.

Device capture conditions 120 may relate to the status and/or operational mode of the image capture device during the capture of the respective image(s). For example, device capture conditions 120 may comprise an indication of: whether the image capture device is capturing so-called secondary frame pairs (SFPs) 122 (which will be described in greater detail below, with reference to FIGS. 2A and 2B), whether an OIS mode of the image captured device has been properly engaged 124, whether an HDR mode of the image capture device has been engaged 126, whether flicker has been detected in one or more of the incoming captured images 128, positional or orientation data related to the image capture device during the capture of the relevant parts of the incoming image stream 130, whether it is permissible to disrupt the incoming image stream 132, such as with a long exposure image capture, and/or the type or number of image capture devices (e.g., cameras) used to capture the incoming images 134. For example, with regard to element 130, an indication that the image capture device was translating or rotating faster than some threshold movement amount during the capture of a particular image may cause the unified scheme to either not include the particular image, or at least not select the particular image to serve in the role of reference image during the fusion operation. With regard to element 132, in some embodiments, it may not be permissible to interrupt the incoming image stream with a long exposure image capture because, e.g., the image capture device may simultaneously be capturing a video stream at a particular frame rate when the capture request is received, and stopping to capture the long exposure image could cause the video stream to drop its frame rate, which may be undesirable or unacceptable in a given implementation.

Image capture conditions 121 may relate to a property and/or characteristic of a particular respective image captured by the image capture device. For example, image capture conditions 121 may comprise an indication of: ambient light levels around the image capture device during the capture of the respective image 136 (e.g., in terms of a signal-to-noise ratio (SNR), a dynamic range (DR), and AE estimate value, etc.); the makeup of a captured image's content 138, (e.g., in terms of an image histogram, brightness score, sharpness score, tone curve(s), noise level, face detection, animal detection, or person detection results for the image, etc.); and/or scene classification 140, e.g., a machine learning model can run in the background and analyze/classify the scene captured in incoming images based on a variety of criteria (e.g., smile/blink/emotion detection, event type, scene dynamism, etc.).

As mentioned above, the one or more device and/or image capture conditions are evaluated by the image bracket selection logic 145. The image bracket selection logic 145 may thus determine a set of two or more selected images 150 (including, potentially, an alteration to a default exposure value of a given image and/or a designation of which selected image(s) will serve as the reference), which images may be utilized for the rest of the improved image fusion processing pipeline, for example, returning to Step 112 of FIG. 1A.

Figure 2A:
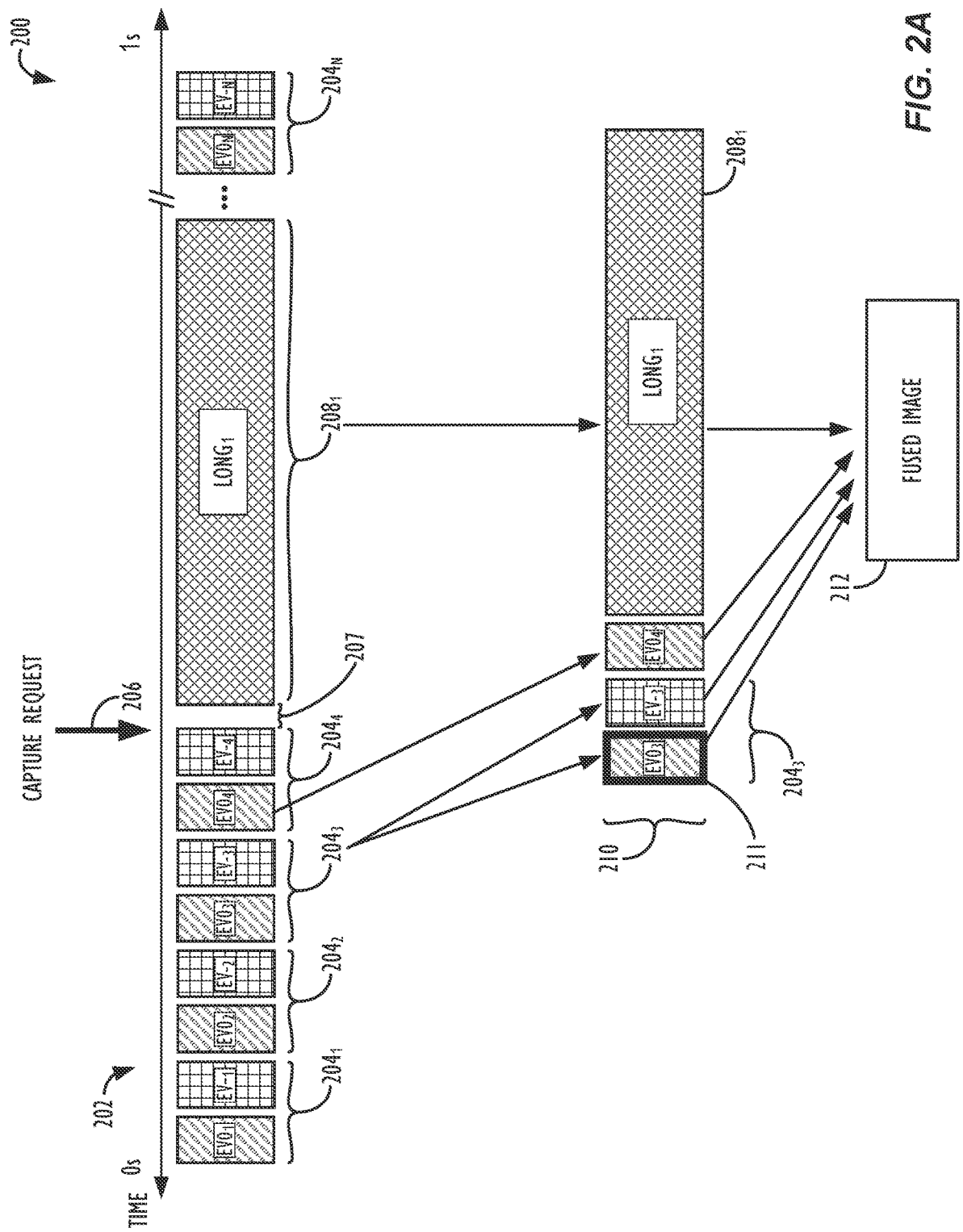
FIG. 2A illustrates an exemplary incoming image stream that may be used in an adaptive, subject-aware image bracket selection and fusion method when no human or animal subject is detected, according to one or more embodiments.

Referring now to FIG. 2A, an exemplary incoming image stream 200 that may be used in an adaptive, subject-aware image bracket selection and fusion method is shown, according to one or more embodiments. Images from incoming image stream 200 may be captured along a timeline, e.g., exemplary image capture timeline 202, which runs from a starting point labeled 0 seconds, to a point labeled as 1 second. It is to be understood that this timeline is presented merely for illustrative purposes, and that a given incoming image stream could be captured for seconds, minutes, hours, days, etc., based on the capabilities and/or needs of a given implementation.

According to some embodiments, EV0 image frames in the incoming image stream may, by default, be captured according to a first frame rate, e.g., 15 frames per second (fps), 30 fps, 60 fps, etc. In some embodiments, this frame rate may remain constant and uninterrupted, unless (or until) a capture request 206 is received at the image capture device. In other embodiments, the frame rate of capture of EV0 image frames may vary over time, based on, e.g., one or more device conditions, such as device operational mode, available processing resources, ambient lighting conditions, thermal conditions of the device, etc.

In other embodiments, one or more captured EV0 images may be paired with another image as part of an aforementioned secondary frame pair, or "SFP." The SFP, according to some embodiments, may comprise an image that is captured and read out from the image sensor consecutively, e.g., immediately following, the capture of the corresponding EV0 image. In some embodiments, the SFP may comprise an EV0 image and: an EV−1 image frame, an EV−2 image frame, or an EV−3 image frame, etc. EV−+images will have a lower exposure time and thus be somewhat darker and have more noise than their EV0 counterpart images, but they may do a better job of freezing motion and/or representing detail in the brighter regions of images—and may even come from the image sensor pre-registered with its corresponding EV0 image.

In the example shown in FIG. 2A, SFPs 204 are captured sequentially by the image capture device (e.g., $204_1$, $204_2$, $204_3$, $204_4$, and so forth), with each SFP including two images with differing exposure values, e.g., an EV0 image and a corresponding EV− image. Note that the EV0 and EV− images illustrated in FIG. 2A use a subscript notation (e.g., $EV_{-1}$, $EV_{-2}$, $EV_{-3}$, $EV_{-4}$, and so forth). This subscript is simply meant to denote different instances of images being captured (and not different numbers of exposure stops). It is to be understood that, although illustrated as pairs of EV0 and EV− images in the example of FIG. 2A, any desired pair of exposure levels could be utilized for the images in an SFP, e.g., an EV0 image and an EV−2 image, or an EV0 image and in EV−3 image, etc. In other embodiments, the SFP may even comprise more than two images (e.g., three or four images), based on the capabilities of the image capture device.

In some embodiments, the relative exposure settings of the image capture device during the capture of the images comprising each SFP may be driven by the image capture device's AE mechanism. Thus, in some instances, the exposure settings used for each SFP may be determined independently of the other captured SFPs. In some instances, the AE mechanism may have a built in delay or lag in its reaction to changes in ambient lighting conditions, such that the AE settings of the camera do not change too rapidly, thereby causing undesirable flickering or brightness changes. Thus, the exposure settings for a given captured image (e.g., EV0 image, EV− image, and/or EV+ image) may be based on the camera's current AE settings. Due to the consecutive nature of the readouts of the images in an SFP, it is likely that each image in the SFP will be driven by the same AE settings (i.e., will be captured relative to the same calculated EV0 settings for the current lighting conditions). However, if the delay between captured images in an SFP is long enough and/or if the camera's AE mechanism reacts to ambient lighting changes quickly enough, in some instances, it may be possible for the images in a given SFP to be driven by different AE settings (i.e., the first image in the SFP may be captured relative to a first calculated EV0 setting, and the second image in the SFP may be captured relative to a second calculated EV0 setting). Of course, outside of the context of SFPs, it may also be possible for consecutive captured images, e.g., from an incoming image stream, to be captured relative to different calculated EV0 settings, again based, e.g., on changing ambient lighting conditions and the rate at which the camera's AE mechanism updates its calculated EV0 settings.

According to some embodiments, the capture frame rate of the incoming image stream may change based on the ambient light levels (e.g., capturing at 30 fps in bright light conditions and at 15 fps in low light conditions). In one example, assuming that the image sensor is streaming captured images at a rate of 30 fps, the consecutive SFP image pairs (e.g., EV0, EV−) are also captured at 30 fps. The time interval between any two such SFP captures would be $\frac{1}{30}^{th}$ of a second, and such interval may be split between the capturing of the two images in the SFP, e.g., the EV0 and EV− images. According to some embodiments, the first part of the interval may be used to capture the EV0 image of the pair, and last part of the interval may be used to capture the EV− image of the pair. Of course, in this 30 fps example, the sum of the exposure times of the EV0 and EV− images in a given pair cannot exceed $\frac{1}{30}^{th}$ of a second.

Moving forward along timeline 202 to the capture request 206, according to some embodiments, a long exposure image $208_1$ may be captured by the image capture device in response to the receipt of the capture request 206. According to some embodiments, an additional delay 207 may be built in to the image capture stream following the receipt of an capture request 206, e.g., so that any shaking or vibrations caused by a user's touching or selection of a capture button on the image capture device (e.g., either a physical button or software-based user interface button or other graphical element) may be diminished before the initiation of the long exposure image capture, which, although more likely to produce a low-noise image, is potentially more prone to blurring, and thus lack of sharpness, due to the amount of time the shutter stays open during the capture of the long exposure image.

As described above, based on the evaluation of one or more capture conditions, the image capture device may then determine and select two or more images 210 for inclusion in the image fusion operation. In the example of FIG. 2A, the images: $EV0_3$, $EV-_3$, $EV0_4$, and $LONG_1$ have been selected for inclusion in the fusion operation, and, in particular, one of images $EV0_3$ or $EV-_3$ (from secondary frame pair $204_3$) may be selected to serve as the final reference image. According to some embodiments, as an initial step, one or more of the SFPs may be identified as "candidate reference image pairs," i.e., an image pair from which the final reference image for the fusion operation may be taken. In some embodiments, the candidate reference image pairs may comprise a predetermined number of SFPs captured prior to (and/or after) a received capture request. For example, in some embodiments, the candidate reference image pairs may comprise the four SFPs captured prior to the capture request. Next, a particular candidate reference image pair may be selected as the "selected reference image pair." For example, the selected reference image pair may be selected based, at least in part, on a comparison of the sharpness scores of the pair's respective EV0 image to sharpness scores of the respective EV0 images of the other candidate reference image pairs. For example, the selected reference image pair may be the SFP having the sharpest EV0 image. In other embodiments, the determination of the selected reference image pair may be based on one or more timing measures or image/device capture conditions. In still other embodiments, the determination of the selected reference image pair may be based on scene content, as is described in greater detail below with reference to FIG. 3. As mentioned above, in the example illustrated in FIG. 2A, secondary frame pair $204_3$ has been selected as the selected reference image pair, due, e.g., to the fact that $EV0_3$ may be the sharpest EV0 image from among the EV0 images being considered for the fusion operation (or whatever image aspect or combination of aspects the reference image selection decision may be based on for a given implementation).

According to such embodiments, from the selected reference image pair (e.g., comprising one EV0 image and one EV− image), the process may select one image to serve as the final reference image 211, e.g., either the EV0 image or the EV− image from the selected reference image pair. The determination of which image from the selected reference image pair to select to serve as the final reference image for the fusion operation may be based on a number of factors. For example, the determination may be based on various image aspects, such as: noise level, sharpness, and/or the presence (or prevalence) of ghosting artifacts. For example, in order to ensure lower noise, the EV0 image may be selected as the final reference image, especially in lower ambient light level conditions. On the other hand, e.g., in dynamic scenes with moving objects and/or people, the EV− image may be preferred as the final reference image because it ensures a shorter exposure time and hence less motion blurring than the corresponding EV0 image from the selected reference image pair. In the example illustrated in FIG. 2A, $EV0_3$ has been selected to serve as the final reference image 211 for the fusion operation (as indicated by the thicker border line on $EV0_3$). Once a final reference image is selected, each of the other selected images 210, e.g., including $EV-_3$, $EV0_4$ and long exposure image $208_1$ in the example illustrated in FIG. 2A, may be registered with respect to the final reference image 211.

The fusion operation of the selected images will result in fused image 212. As will be explained below with reference to FIG. 3, the decision of which types of images to include in the fusion operation, what sequence such images should be captured in, and/or how the default exposure values of such images should be modified may be based on a set of predetermined rules and/or decision table that may be used to translate various capture conditions and/or image conditions (e.g., whether or not the images include one or more human or animal subjects, or faces thereof) into the sets of images that will be selected for the image fusion operation. As illustrated in FIG. 2A, the default exposure time of long exposure image $208_1$ (also labeled "LONG$_1$" in FIG. 2A) has not been modified in any way, which may indicate that no human or animal subjects were detected in the incoming image stream at or around the moment that capture request 206 was received. As also illustrated in the example of FIG. 2A, after the capture of the long exposure image, the image capture stream may go back to capturing SFPs $204_N$, EV0 images, or whatever other pattern of images is desired by a given implementation, e.g., until the next capture request is received, thereby triggering the capture of another long exposure image, or until the device's camera functionality is deactivated.

Figure 2B:
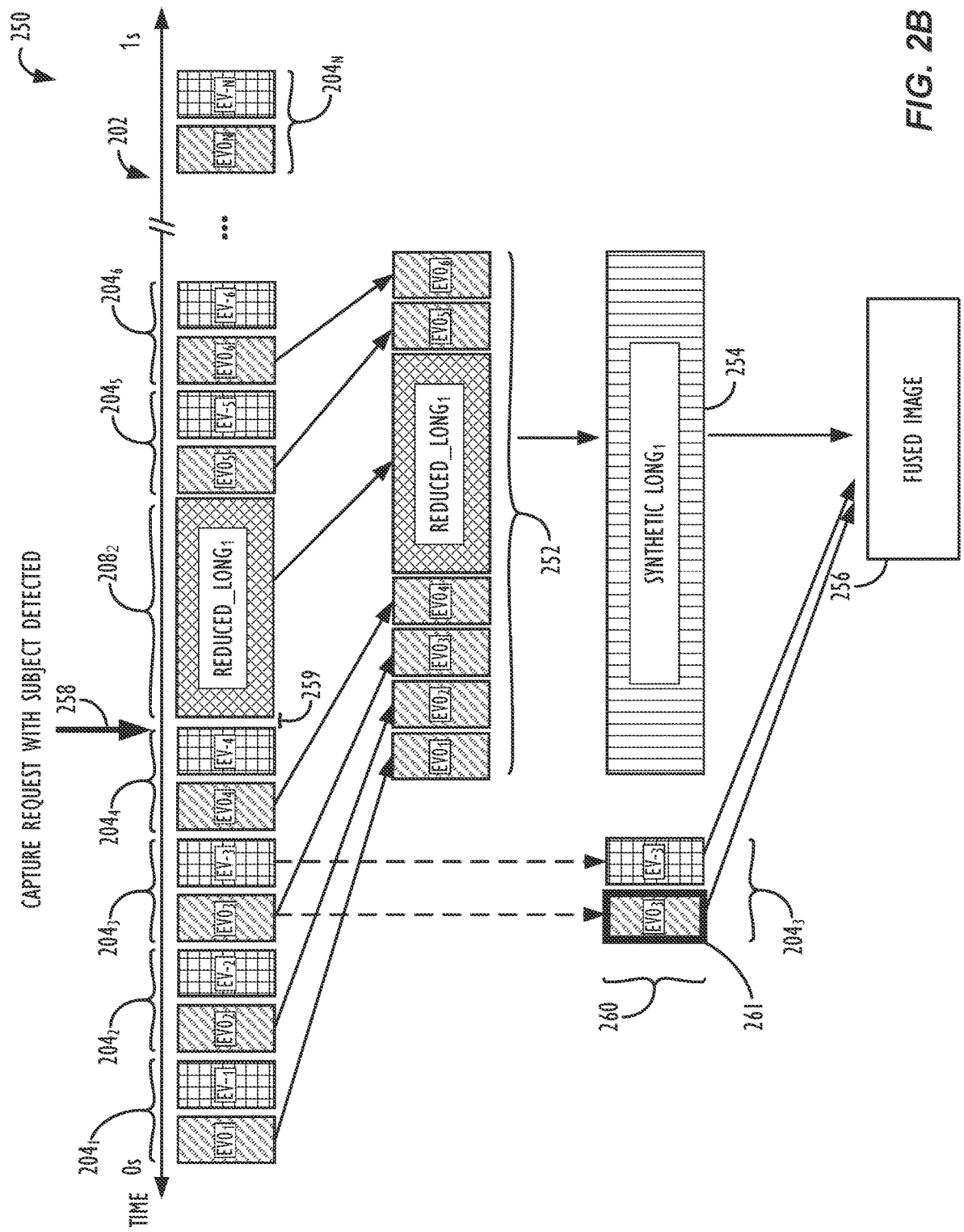
FIG. 2B illustrates another exemplary incoming image stream that may be used in an adaptive, subject-aware image bracket selection and fusion method when at least one human or animal subject is detected, according to one or more embodiments.

Referring now to FIG. 2B, another exemplary incoming image stream 250 that may be used in an adaptive, subject-aware image bracket selection and fusion method when at least one human or animal subject is detected is shown, according to one or more embodiments. In contrast with FIG. 2A, in the incoming image stream 250 shown in FIG. 2B, the image capture device reduces the exposure time of long exposure image $208_2$ (also labeled "REDUCED_LONG1" in FIG. 2B) relative to a default long exposure image exposure time (e.g., a default long exposure image exposure time determined based, at least in part, on the capture conditions when the capture request was received, as illustrated in long exposure image $208_1$ of FIG. 2A), e.g., due to the fact that at least one human or animal subject has been detected in the incoming image stream in the example of FIG. 2B. For example, in some embodiments, the reduced long exposure time image may have 50% of the exposure time of the default long exposure image, although the example of a 50% reduction is merely illustrative, and the amount of reduction in default exposure time may be set or reduced to some other value, based on scene content, capture conditions, and/or controlled by a tuning table suited to the needs of a given implementation. Additionally, the image capture device may take one or more additional short exposure images (e.g., as shown by secondary frame pairs $204_5$-$204_6$ in FIG. 2B) after the capture of long exposure image $208_2$ (although, it is to be understood that the additional images could be captured in any desired sequence or order with reduced long exposure image $208_2$).

In the example of FIG. 2B, a set of images 252, e.g., two short exposure EV0 images captured after the capture request ($204_5$-$204_6$) and four short exposure EV0 images captured prior to the capture request ($204_1$-$204_4$), are selected and fused together with the reduced long exposure image $208_2$ (e.g., via an averaging algorithm) into a synthetic long exposure image (SYNTHETIC LONG$_1$ 254). In other embodiments, a different number of short exposure images (and/or a different sequence of short exposure images) may be fused together with the reduced long exposure image to form the synthetic long exposure image 254, as is desired for a given implementation.

For example, in a given embodiment, only the EV0 images captured prior to a capture request 258 (e.g., a capture request for which at least one human or animal subject has been detected in the incoming image stream) may be used, only the EV0 images captured after the capture request 258 may be used, or a desired combination of EV0 images captured both prior to and after the capture request 258 may be used. In still other embodiments, one or more EV− images captured prior to and/or after the capture request 258 may also be used to form the synthetic long exposure image 254. For example, in one embodiment, a synthetic long exposure image 254 may be formed by combining various selected EV0 and EV− images with a reduced long exposure image $208_2$, e.g., via a weighted combination, where highlight regions may be taken largely from the various EV− images, and the remaining parts of the scene are taken from the various EV0 images and/or reduced long exposure image. In still other embodiments, an additional blurred frame elimination process may be executed on the set of images 252 selected for fusion into the synthetic long exposure image. For example, any EV0 frames (or reduced long exposure image frames) that have greater than a threshold amount of blur, e.g., wherein the permissible threshold amount of blur may be based on a comparison to the amount of blur in the selected reference image (i.e., EV0₃ in the case of FIG. 2B), may be discarded from use in the creation of the synthetic long exposure image. For example, in the example illustrated in FIG. 2B, if image EV0₅ had been determined to have more than the maximum threshold amount of blur for the current capture operation, it could have been discarded from use in the creation of the synthetic long exposure image 254.

In some cases, a synthetic long exposure image may be desirable because a given implementation may not want to capture a long exposure image in response to a capture request, as it may disrupt a video stream that is concurrently being captured by the image capture device when the image capture request is received. In other cases, a synthetic long exposure image (e.g., generated from a reduced long exposure image and one or more other shorter exposure images) may be desirable if there are low lighting conditions and/or if there are one or more human or animal subjects (with or without detected faces) in the captured scene. In particular, low lighting conditions may lead to increased noise or blurring in captured images, the effects of which may be limited to some extent by capturing and fusing a larger number of individual shorter exposure images. In some instances, when a synthetic long exposure image is generated from a reduced long exposure image (e.g., as opposed to capturing a single long exposure image, as in FIG. 2A), the delay 259 and/or the overall capture time interval for images included in the fusion operation may be shortened (i.e., as compared to the case when a long exposure image is captured in response to the capture request), and the multiple short exposure images 252 used to generate the synthetic long exposure image may be less susceptible to blurriness caused by internal scene motion and/or any residual device motion from a user's interaction with the image capture device (e.g., touch input) to indicate the capture request 258 than would a typical long exposure image. However, some scenes may be so dark that even the use of a synthetic long exposure image would not be desirable, e.g., due to the increased noise that would result in the constituent short exposure images used to create the synthetic long exposure image.

Once the synthetic long exposure image 254 has been created, it may be fused with any other selected images from the incoming image stream (e.g., images 260, including secondary frame pair 204₃ comprising reference image EV0₃ 261 and EV-₃, as well as synthetic long exposure image 254, in the example illustrated in FIG. 2B), in order to form the resultant fused image 256.

Figure 3:
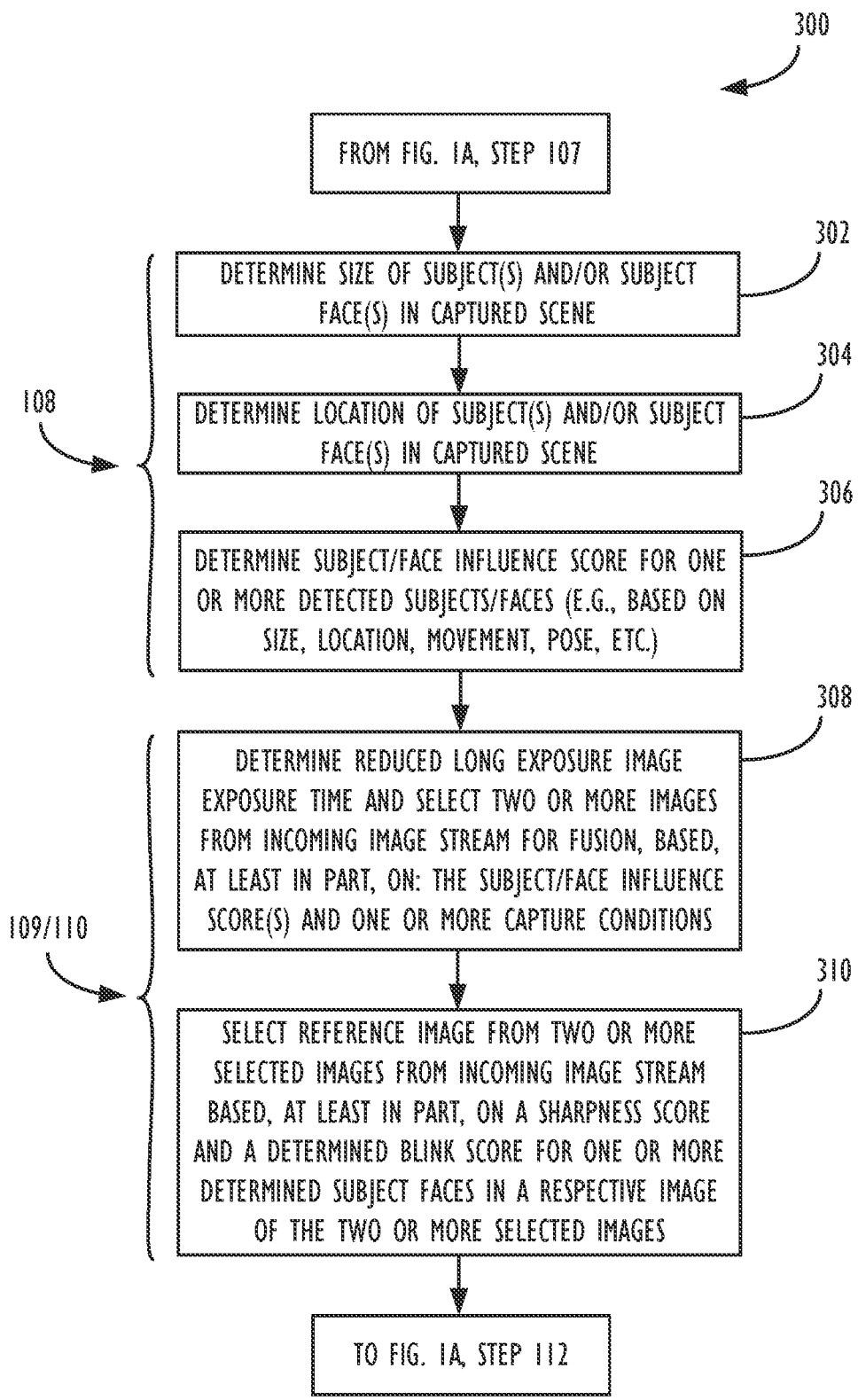
FIG. 3 is a flow chart illustrating additional details for a method of adaptive, subject-aware image bracket selection and fusion, according to one or more embodiments.

Referring now to FIG. 3, a flow chart 300 illustrating additional details for a method of adaptive, subject-aware image bracket selection and fusion is shown, according to one or more embodiments. As illustrated, various steps in flow chart 300 provide additional details to Steps 108, 109, and 110, described above with reference to FIG. 1A. For example, Steps 302, 304, and 306 pertain to additional optional details to implement Step 108, and Steps 308 and 310 pertain to additional optional details to implement Steps 109 and 110.

Returning now to Step 302, in addition to detecting whether there are one or more human or animal subjects in the incoming image stream, desired subject detection and/or face detection algorithms may be run on the images in the incoming image stream, such that, for each captured image (or a desired number of captured images), a size of one or more subjects and/or faces in the captured image may be determined (e.g., in terms of a bounding box dimensions) (Step 302), and a location within the image stream images of the one or more subjects and/or faces may also be determined (e.g., in terms of a bounding box coordinates) (Step 304). Based at least in part on the size and locations of subjects and/or faces determined in Steps 302 and 304, respectively, a subject/face influence score may be determined for one or more detected subjects and/or faces (Step 306). As may now be appreciated, the relative of "influence" of a given face or subject's body in a captured image may be related to its size, i.e., the amount of the overall image frame that it takes up, and/or its location, i.e., how prominently placed the subject/face is within the overall image frame, as well as a number of other desired factors, such as the subject/face's positioning, pose, movement, etc. Generally speaking, a detected subject/face in an image may have a higher influence score the larger and more well-centered and/or well-posed it is within the image frame, while a detected subject/face in an image may have a lower influence score the smaller and more peripherally-placed and/or ill-posed it is within the image frame. The use of an influence score may provide process 100 with more granularity, e.g., in deciding whether (and/or to what extent) to reduce the exposure time of a planned long exposure image capture relative to its default exposure time value. For example, if each face detected in a captured scene takes up only an 80 pixel by 80 pixel box, and is located along the top edge of a captured image, these may be audience members or spectators in the background of a captured scene, and thus it may not be prudent to determine, select, or modify the exposure times of images for inclusion in the fusion operation (e.g., planned long exposure image captures) based on the detected presence of said audience members or spectators in the captured scene.

As was described above with reference to Steps 109 and 110 of process 100, a reduced long exposure image exposure time may be determined, and then two or more images from the incoming image stream may be selected for the fusion operation, wherein at least one of the selected images from the incoming image stream comprises an image captured with the reduced long exposure image exposure time. Turning now to Step 308, the image selection process may be enhanced by further basing the determination of the reduced long exposure image exposure time and/or selection of images from the incoming image stream for the fusion operation, at least in part, on the determined subject/face influence scores (e.g., from previous Step 306) and the one or more capture conditions (e.g., from Step 104). For example, if there is at least one subject/face detected with greater than a threshold influence score, then it may be determined to select a long exposure image with a maximally reduced exposure time (e.g., 50% of the default long exposure time). As another example, if every subject/face detected has lower than a threshold influence score, then it may be determined to use the default long exposure image exposure time. It is to be understood that, as mentioned above with respect to Step 110, capture conditions may also play a role (and even an overriding role) in the determination and selection of images (and their respective exposure times) from the incoming image stream for inclusion in fusion operations. For example, if the ambient light levels in the captured scene are below are certain threshold, then it may simply be determined that no long exposure images (or even reduced long exposure images) may be captured or included in the fusion operations. Similarly, the influence score of any detected subjects/faces, as well as the capture conditions, may also help determine the order or sequence in which the determined images may be captured by the incoming image stream.

Improved Reference Frame Selection

As a further enhancement to the fusion operations, at Step 310, a reference image may be selected from among the two or more images from incoming image stream based, at least in part, on image content. In some cases, that may comprise consideration of a sharpness score and a determined blink score (and/or smile or other expression-related score) for one or more determined subject faces in a respective image of the two or more images.

As mentioned above, in some cases, the sharpness score for a given image may be a face sharpness score, e.g., a sharpness score specifically determined based on a subset of image information corresponding to the faces of one or more subjects detected in the image, i.e., as opposed to the sharpness of the overall image frame. Thus, a face sharpness score may be used to indicate whether a particular face in an image is in focus, without consideration of how well-focused the overall image frame is (which may be helpful, e.g., in not discounting or discarding images for reference image selection when there is a prominent face that is in focus but large portions of the background of the captured scene that are intentionally out of focus).

A blink score (or other desired expression-related score) may also be determined for a given captured image to aid in the reference frame selection process. According to some embodiments, a blink score may be calculated by first locating a face in a captured image and then, e.g., according to face heuristics or output from face detection algorithms, identifying a sub-portion(s) of the face wherein the subject's eyes are most likely be located (e.g., based on relationship to the location of other detected facial features, canonical face models, overall face size and shape, pose, orientation, etc.). Next, within the identified sub-portions of the face where the eyes are most likely to be located, a variance estimate may be made, based on the colors and/or luma intensity values of the pixels located within the identified sub-portions. Because closed eyes tend to be more uniform in coloration (i.e., being dominated by the color of the eyelid skin), closed eyes tend to exhibit lower variance values, while open eyes (i.e., being dominated by irises, pupils, sclerae, veins, etc.) tend to exhibit higher variance values. Thus, in some embodiments, a variance threshold may be defined, below which it may be determined that a candidate eye comprises a blinking eye.

If there are multiple faces detected in a given image, eye locations may be inferred for all such detected faces, then variance estimates may be made for each inferred eye location, and, finally, the eye location variance estimates may be combined in any desired fashion (e.g., added together, averaged, weighted average, etc.) to determine an overall blink score for the image. In some embodiments, it may also be configured whether to compute variance estimates for just left eyes, just right eyes, both eyes, one eye per person (e.g., so as to not penalize for intentional winking in an image), etc.

According to some embodiments, the sharpness score (e.g., face sharpness score) and blink score for each candidate reference image may be combined in any desired fashion (e.g., added together, averaged, weighted average, etc.) to determine an overall reference score for the image. According to some embodiments, the overall reference score for the image may be determined as a linear combination of the relevant score values, e.g.: (0.2*sharpness score)+ (0.8*blink score). Although, it is to be understood that different weighting schemes may be preferred (possibly including additional factors, such as face size, estimated age of human subject, estimated type of animal subject, etc.), based on the needs of a given implementation. In some implementations, sharpness and/or blink scores may not even be computed for detected faces below a threshold minimum size, in order to save computation time on faces not likely to have a large impact on a given image's suitability to serve as a reference image.

In other embodiments, other types of scene/object detectors, such as smile detectors, mouth open/closed detectors, and other facial expression detectors may additionally (or alternatively) be employed. In those cases, based on whether the detected object is a desired characteristic, the presence (or absence) of such objects may be used to further weight the overall reference score of a given image. For example, assuming smiles are desirable according to a given implementation, the detection of a smile within an image may increase its reference score (and, thus, overall chances of being selected as the reference image), whereas detection of a frown within an image may decrease its reference score (and, thus, overall chances of being selected as the reference image).

Exemplary Electronic Devices

Figure 4:
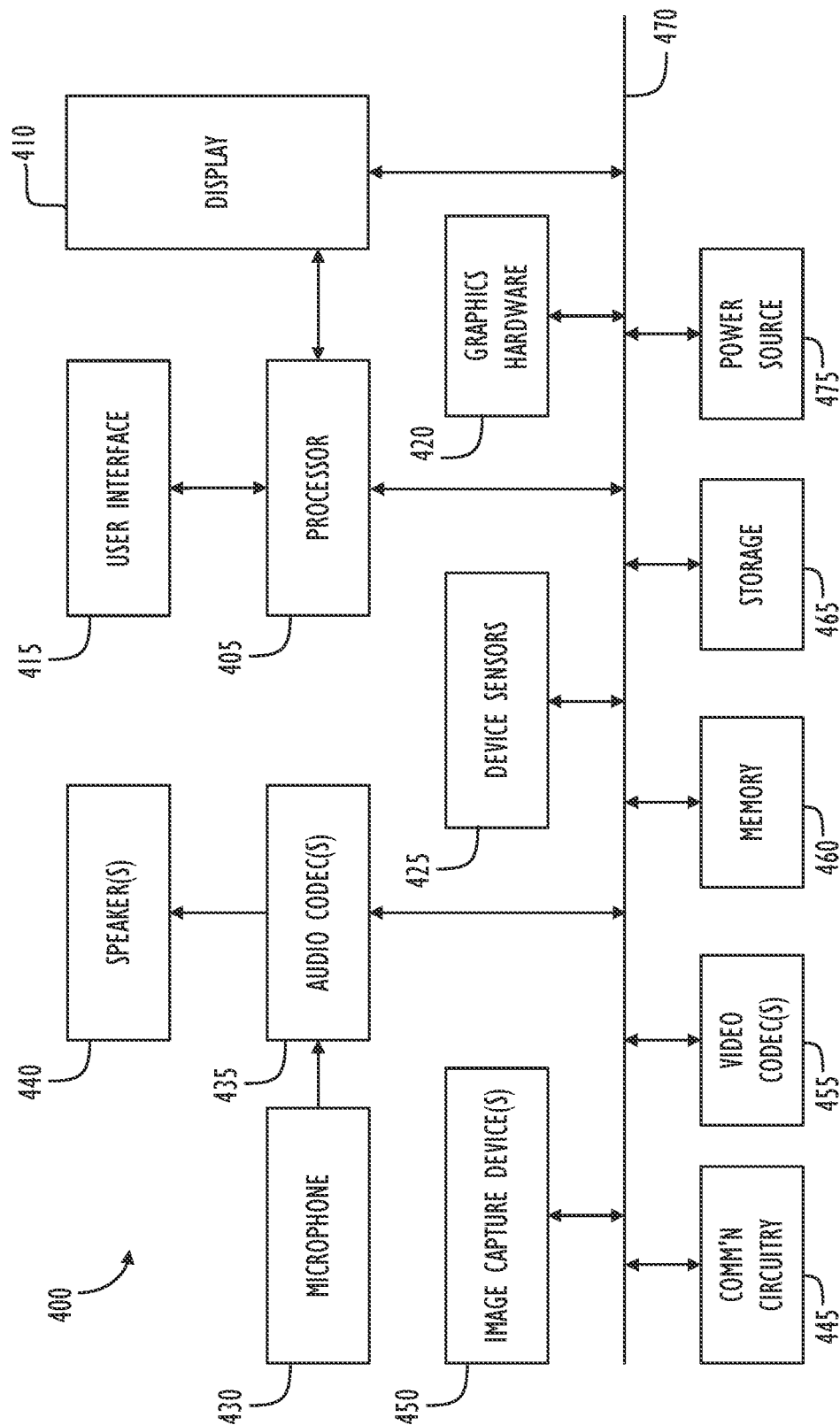
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., SIS, HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular frame(s) that the user would like to capture (e.g., by clicking on a physical or virtual button at the moment the desired frame is being displayed on the device's display screen). In one embodiment, display 410 may display a video stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks.

In one embodiment, graphics hardware 420 may include one or more programmable graphics processing units (GPUs).

Image capture device 450 may comprise one or more camera units configured to capture images, e.g., images which may be processed to generate fused versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 400.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices;
   a display;
   a user interface; and
   one or more processors operatively coupled to the memory, wherein the one or more processors are configured to execute instructions causing the one or more processors to:
   obtain an incoming image stream from the one or more image capture devices;
   obtain one or more capture conditions associated with the incoming image stream;
   receive a capture request via the user interface;
   determine a default long exposure image exposure time based, at least in part, on the capture conditions when the capture request was received;
   detect one or more human or animal subjects in the incoming image stream;
   determine, in response to detecting one or more human or animal subjects in the incoming image stream, a reduced long exposure image exposure time, wherein the reduced long exposure image exposure time is shorter than the default long exposure image exposure time;
   select, in response to the capture request, two or more images from the incoming image stream based, at least in part, on the one or more capture conditions, wherein at least one of the selected images from the incoming image stream comprises an image captured with the reduced long exposure image exposure time;
   register the selected two or more images;
   fuse the registered two or more images to form a fused image; and
   store the fused image in the memory.

2. The device of claim 1, wherein the incoming image stream comprises images with two or more different exposure values.

3. The device of claim 2, wherein the incoming image stream comprises a plurality of sequentially captured images, wherein the exposure values of the plurality of sequentially captured images follows a pattern of default exposure values.

4. The device of claim 1, wherein at least one of the selected images from the incoming image stream comprises an image captured after the receiving of the capture request.

5. The device of claim 4, wherein the image captured after the receiving of the capture request comprises a reduced long exposure image.

6. The device of claim 5, wherein an exposure time of the reduced long exposure image is based, at least in part, on a pose of one or more human or animal subjects detected in the incoming image stream.

7. The device of claim 1, wherein the instructions to detect one or more human or animal subjects in the incoming image stream further comprise instructions to:
   detect one or more human or animal subjects in an image captured immediately prior to receiving the capture request.

8. The device of claim 1, wherein the instructions to detect one or more human or animal subjects in the incoming image stream further comprise instructions to:
   determine a size of one or more faces of the one or more human or animal subjects;
   determine a location within an image of the incoming image stream of the one or more faces of the one or more human or animal subjects; and
   determine a face influence score for each of the one or more faces of the one or more human or animal subjects based, at least in part, on the respective determined size and determined location of a respective face,
   wherein the reduced long exposure image exposure time is further based, at least in part, on a determined face influence score of at least one face in the at least one of the selected images.

9. The device of claim 1, wherein the instructions to select, in response to the capture request, two or more images from the incoming image stream based, at least in part, on the one or more capture conditions further comprise instructions to:
   select a reference image from among the two or more images from the incoming image stream based, at least in part, on a sharpness score and a blink score for the selected reference image.

10. The device of claim 9, wherein the sharpness score of the selected reference image further comprises a face sharpness score.

11. The device of claim 9, wherein the blink score of the selected reference image further comprises a variance estimate in a portion of the selected reference image where an eye of a human or animal subject is determined to be located.

12. The device of claim 9, wherein the instructions to select a reference image from among the two or more images from the incoming image stream based, at least in part on a sharpness score and a blink score the selected reference image further comprise instructions to:
    select a reference image from among the two or more images from the incoming image stream based, at least in part, on a weighted combination of the sharpness score and the blink score the selected reference image.

13. A non-transitory program storage device comprising instructions stored thereon to cause one or more processors to:
    obtain an incoming image stream from one or more image capture devices;
    obtain one or more capture conditions associated with the incoming image stream;
    receive a capture request from at least one of the one or more image capture devices;
    determine a default long exposure image exposure time based, at least in part, on the capture conditions when the capture request was received;
    detect one or more human or animal subjects in the incoming image stream;
    determine, in response to detecting one or more human or animal subjects in the incoming image stream, a reduced long exposure image exposure time, wherein the reduced long exposure image exposure time is shorter than the default long exposure image exposure time;
    select, in response to the capture request, two or more images from the incoming image stream based, at least in part, on the one or more capture conditions, wherein at least one of the selected images from the incoming image stream comprises an image captured with the reduced long exposure image exposure time;
    register the selected two or more images;
    fuse the registered two or more images to form a fused image; and
    store the fused image in a memory.

14. The non-transitory program storage device of claim 13, wherein the instructions to detect one or more human or animal subjects in the incoming image stream further comprise instructions to:
    determine a size of one or more faces of the one or more human or animal subjects;
    determine a location within an image of the incoming image stream of the one or more faces of the one or more human or animal subjects; and
    determine a face influence score for each of the one or more faces of the one or more human or animal subjects based, at least in part, on the respective determined size and determined location of a respective face,
    wherein the reduced long exposure image exposure time is further based, at least in part, on a determined face influence score of at least one face in the at least one of the selected images.

15. The non-transitory program storage device of claim 13, wherein the instructions to select, in response to the capture request, two or more images from the incoming image stream based, at least in part, on the one or more capture conditions further comprise instructions to:
    select a reference image from among the two or more images from the incoming image stream based, at least in part, on a sharpness score and a blink score for the selected reference image.

16. The non-transitory program storage device of claim 15, wherein the sharpness score of the selected reference image further comprises a face sharpness score.

17. The non-transitory program storage device of claim 15, wherein the blink score of the selected reference image further comprises a variance estimate in a portion of the selected reference image where an eye of a human or animal subject is determined to be located.

18. A method, comprising:
    obtaining an incoming image stream from one or more image capture devices;
    obtaining one or more capture conditions associated with the incoming image stream;
    receiving a capture request from at least one of the one or more image capture devices;
    determining a default long exposure image exposure time based, at least in part, on the capture conditions when the capture request was received;
    detecting one or more human or animal subjects in the incoming image stream;
    determining, in response to detecting one or more human or animal subjects in the incoming image stream, a reduced long exposure image exposure time, wherein the reduced long exposure image exposure time is shorter than the default long exposure image exposure time;
    selecting, in response to the capture request, two or more images from the incoming image stream based, at least in part, on the one or more capture conditions, wherein at least one of the selected images from the incoming image stream comprises an image captured with the reduced long exposure image exposure time;
    registering the selected two or more images;
    fusing the registered two or more images to form a fused image; and
    storing the fused image in a memory.

19. The method of claim 18, wherein detecting one or more human or animal subjects in the incoming image stream further comprises:
    determining a size of one or more faces of the one or more human or animal subjects;
    determining a location within an image of the incoming image stream of the one or more faces of the one or more human or animal subjects; and
    determining a face influence score for each of the one or more faces of the one or more human or animal subjects based, at least in part, on the respective determined size and determined location of a respective face,
    wherein the reduced long exposure image exposure time is further based, at least in part, on a determined face influence score of at least one face in the at least one of the selected images.

20. The method of claim 18, wherein selecting, in response to the capture request, two or more images from the incoming image stream based, at least in part, on the one or more capture conditions further comprises:
    selecting a reference image from among the two or more images from the incoming image stream based, at least in part, on a face sharpness score and a blink score for the selected reference image.

\* \* \* \* \*